A. W. BURKE.
EXCESS WATTMETER.
APPLICATION FILED FEB. 24, 1916.
1,284,231.
Patented Nov. 12, 1918.
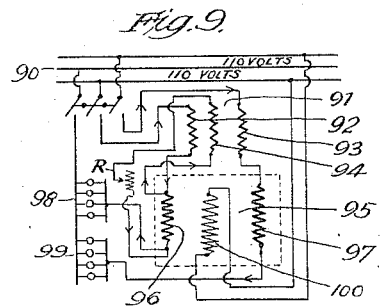
Fig. 9.
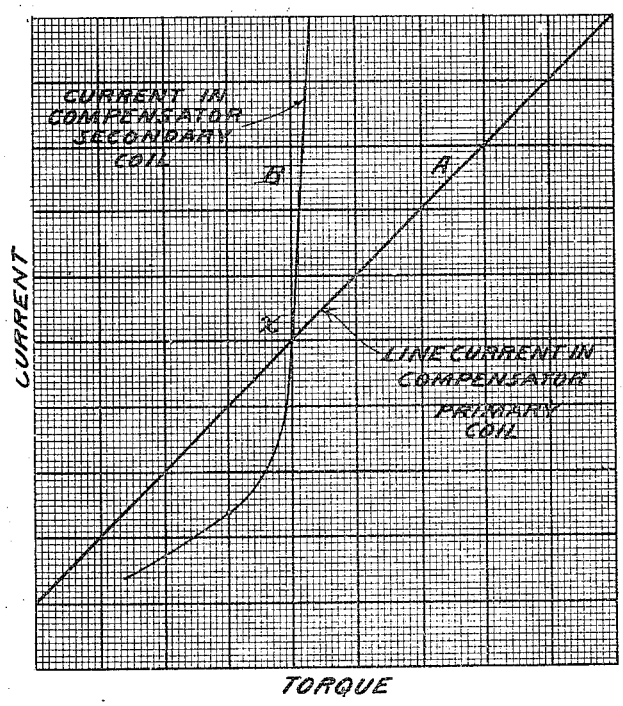
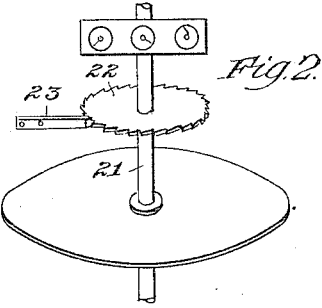
Fig. 2.
Fig. 1.
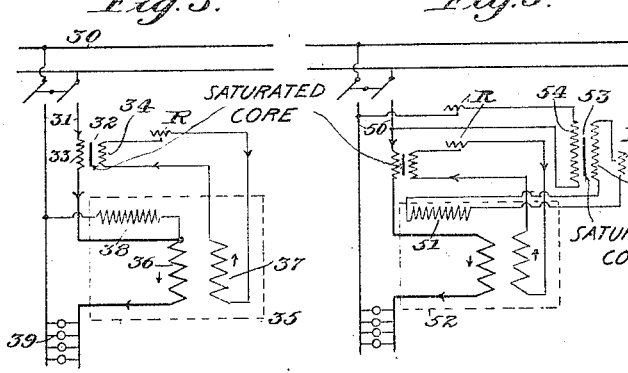
Fig. 3.  Fig. 5.  Fig. 7.
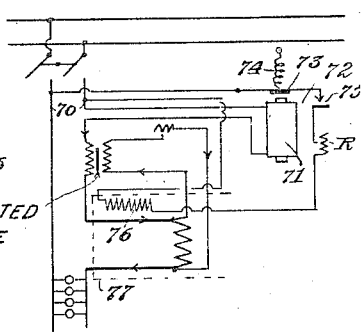
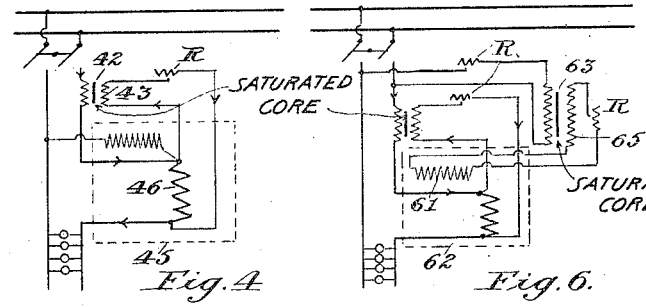
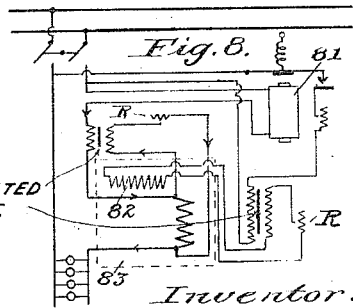
Fig. 4.  Fig. 6.  Fig. 8.
Inventor:
Alfred W. Burke
by Byrnes Townsend Mr Kryshan
Atty's.

UNITED STATES PATENT OFFICE.

ALFRED W. BURKE, OF WILMINGTON, DELAWARE.

EXCESS-WATTMETER.

1,284,281.                 Specification of Letters Patent.        Patented Nov. 12, 1918.

Application filed February 24, 1916.   Serial No. 80,201.

*To all whom it may concern:*

Be it known that I, ALFRED W. BURKE, a subject of the King of Great Britain, residing at Wilmington, in the county of New Castle and State of Delaware, have invented certain new and useful Improvements in Excess-Wattmeters, of which the following is a specification.

This invention relates to recording wattmeters such as are used on alternating current circuits, for recording the electrical energy consumed in excess of a certain predetermined quantity, and is an improvement upon the inventions described in my copending applications Serial No. 813,494, filed January 21, 1914; Serial No. 11,484, filed March 2, 1915; Serial No. 46,974, filed August 23, 1915; and Serial No. 64,990, filed December 4, 1915.

The object of my invention is to produce a meter that will record only the excess energy used over a predetermined quantity and that is substantially unaffected in accuracy by ordinary changes in line voltage.

This result is accomplished by the use of a specially designed transformer, called a compensator, the magnetic circuit of which is normally operated at a flux density far above its magnetic saturation point. The secondary current from the compensator is therefore substantially constant regardless of changes in the primary current above a certain minimum. This secondary current is used to produce a constant negative torque on the meter, which however is prevented from reverse rotation as described hereafter, whereby the consumer's current is not recorded when it is equal to or less in value than the compensator secondary current; any current consumed in excess of this value overcomes the negative torque of the compensator secondary current, and is recorded by the meter.

In the accompanying drawings,—

Figure 1 is a curve showing the relative current strengths in the primary and secondary circuits of a compensator, the point of intersection of the curves representing the point of magnetic saturation of the core;

Fig. 2 illustrates one type of intermittent grip device attached to the rotating element of the meter to prevent reverse rotation and registration;

Figs. 3, 4, 5 and 6 are diagrams of circuits showing different methods of connecting the meter to the electric supply service wires;

Figs. 7 and 8 are duplicates of Figs. 4 and 6, but including a relay to open and close the potential circuit of the meter; and Fig. 9 is a view of a three-wire circuit provided with an excess meter.

In Fig. 1, curve "A" indicates the range of current in the primary of a compensator due to changes in the load; and with constant load, due to fluctuation in line voltage. Curve "B" indicates the variation in current induced in the secondary of the compensator by the variable primary current. The currents have equal values at the point of intersection, "X," which is the point of magnetic saturation of the compensator core. It will be noted that above "X" the increase in current in the compensator secondary (curve B) is practically negligible, while below "X" the current drops off quite rapidly. In practice, the compensator is operated under such conditions that with normal loads the current in the secondary "B" is always above the point of intersection "X."

In Fig. 2, the armature shaft 21 of the meter carries a suitable intermittent-grip device such as a ratchet-wheel 22 and a pawl 23, the intermittent-grip permitting rotation of the meter in one direction only, and thereby preventing negative recording.

In Fig. 3, current from the supply mains 30 enters the house service mains 31, having connected in series therewith the primary 33 of the compensator 32, the latter also provided with a secondary 34. The house current also passes through the watt-meter 35 containing the series coil 36 and the potential coil 38, and through the translating devices 39. In coöperative relation with the series coil 36 in its action upon the wattmeter, is the suitably located balancing or neutralizing coil 37, connected to the secondary 34 of the compensator through the adjustable resistance R, which latter may be of the inductive or non-inductive type. The instantaneous directions of all currents flowing in the circuits are represented by the arrows. With all loads above the contracted-for value, the current induced in the secondary 34, and consequently flowing through the balancing coil 37, is substantially constant in value, as explained under Fig. 1, and hence this coil exerts a constant negative torque upon the meter, equal to the value of the contracted-for load. Any current consumed in excess of the contracted-for load exerts a proportional positive torque through the series coil, and operates the meter accordingly. With loads equal to or below the contracted-for value, the current flowing through the series coil 36 of the watt-meter exerts a weaker torque than that of the balancing coil 37; the meter would therefore rotate in the reverse direction, except that it is checked by the intermittent-grip device shown in Fig. 2 or by other means; consequently no record is made of such loads. The meter record is therefore proportional to the excess load only.

Fig. 4 resembles Fig. 3, except that the secondary 43 of the compensator 42 is connected to the terminals of the series coil 46 in the watt-meter 45. The circuits are connected so that currents flow as indicated by the arrows, and as a result, no current flows through the series coil 46 when the load on the house circuit equals the contracted-for value. With increased loads, a current proportional to the increase energizes the series coil 46 and actuates the meter accordingly; with decreased loads, a current from the compensator secondary 43 energizes the series coil and tends to reverse the meter, but is checked by the intermittent-grip device shown in Fig. 2, or by other means. The meter, therefore, records only the load in excess of the predetermined quantity.

Fig. 5 resembles Fig. 3, except that the potential coil 51 of the watt-meter 52 is connected to the secondary 55 of the compensator 53, the primary 54 of the compensator being connected in shunt across the mains 50. In this case, the compensator 53 delivers a substantially constant voltage to the potential coil 51 of the watt-meter, and it is therefore unaffected by ordinary changes in line voltage. The operation of the meter is otherwise the same as with Fig. 3.

Fig. 6 resembles Fig. 4, except that the potential coil 61 of the watt-meter 62 is supplied by the secondary 65 of the compensator 63, as in Fig. 5. The operation is otherwise the same as described under Figs. 4 and 5.

Fig. 7 resembles Fig. 4, except that the service line 70 is connected in series with the magnet 71 of the relay 72, the armature 73 of which is retracted by the adjustable spring 74, and only permits the contacts 75 to be closed when the load current circulating through the magnet 71 exceeds the contracted-for value. Upon closing the contacts 75, the circuit is completed through the potential coil 76 of the meter 77; the latter then operates as described under Fig. 4. When the load is less than the contracted-for value, the relay does not operate, and contacts 75 remain open; the meter therefore does not operate. The relay 72 is used in place of the intermittent-grip device shown in Fig. 2.

Fig. 8 resembles and operates like Fig. 6 in all respects, except that a relay 81 is included in the circuit of the potential coil 82 of the watt-meter 83. The relay operates as described under Fig. 7.

In Fig. 9, current from the three-wire supply mains 90 traverses the primary coils 92, 93 of compensator 91, and the series coils 96, 97 of the three-wire watt-meter 95, and also the loads 98, 99, the return circuit of which is connected to the neutral wire. The secondary 94 of the compensator is connected to one of the series coils of the watt-meter, for example coil 96. The watt-meter 95 is also supplied with the shunt coil 100, connected across the outer supply mains 30. The compensator 91 is so constructed that its magnetic circuit is not saturated until the predetermined loads 98, 99 on both sides of the house circuits are being consumed; and is further constructed so that its ratio of conversion is greater than 1:1, when the magnetic circuit is not saturated. With the predetermined load on the house mains, the magnetic circuit is saturated, and the ratio of conversion is then 1:1, and with excess loads, the current in the compensator secondary 94 does not increase, as explained under Fig. 3. When less than the full loads 98, 99 are being consumed, the meter tends to reverse, due to the torque of the negative compensator current, but is checked by a device such as illustrated in Fig. 2, or the shunt coil 100 of watt-meter 95 may have a relay, such as shown in connection with Figs. 7 and 8. When the predetermined load is reached, the ratio of conversion in the compensator is 1:1, and the torques due to the series coils 96, 97 are balanced by the torque of the compensator secondary 94; the meter therefore does not tend to rotate. With increased loads, the excess current exercises a torque depending upon the excess current, and the meter is actuated accordingly. The compensator 91 is shown provided with one secondary 94, which is connected to the series coil 96, the series coil 97 not being connected thereto. The energy delivered by the secondary 94 is sufficient to not only balance the series coil 96, but also coil 97 so long as the magnetic circuit of the compensator is not saturated; upon reaching saturation, regardless of the distribution of the load in circuits 98, 99, the excess current is registered. The compensator could be provided with two secondaries, one of which should be connected to series coil 96, and the other to coil 97; or two compensators could be used in place of one, in which case they would be connected in the usual way to the outside mains. While Fig. 9 shows the secondary 94 connected to the terminals of the series coil 96, the secondary could as well be connected to a balancing coil suitably located in the meter, such as shown in Figs. 3 and 5.

While the relays 72 and 81 are shown in connection with diagrams 7 and 8, which are otherwise duplicates of Figs. 4 and 6, respectively, it is within the scope of the invention to apply the relay to connections as shown in Figs. 3, 5 and 9.

I claim:—

1. An alternating current electric meter having a series coil, in combination with a compensator having its primary coil adapted to be energized by current flow in the service mains in which the meter is adapted to be connected and its secondary coil electrically connected to prevent the production of a positive torque by the series coil of the meter until the current flow in the service line exceeds a predetermined strength.

2. An alternating current electric meter having a potential coil and a series coil, in combination with a compensator having its primary coil adapted to be energized by current flow in the service mains in which the meter is adapted to be connected and its secondary coil electrically connected to prevent the production of a positive torque by the series coil of the meter until the current flow in the service line exceeds a predetermined strength, and a second compensator having its primary connected across the supply circuit, and means for energizing the potential coil of the meter by current of substantially constant voltage from the secondary of said second compensator.

3. In an electric meter, the combination of a compensator and a series coil in said meter, the primary coil of said compensator connected in series with the service line and the series coil of the meter, and the secondary of said compensator connected to the series coil in said meter.

4. In an electric meter, the combination of a compensator and a series coil in said meter, the primary coil of said compensator connected in series with the service line and the series coil of the meter, and the secondary of said compensator connected to the series coil in said meter, and means to prevent negative recording of said meter.

5. In an electric meter, the combination of a compensator, coils in said meter, a potential coil in said watt-meter, the primary coil of said compensator connected in series with the service line, the secondary of said compensator connected to a coil in said meter, a second compensator, the primary of which is connected in multiple with the service line, and the secondary of which is connected to the potential coil of the meter.

6. In an electric meter, the combination of a compensator, coils in said meter, a potential coil in said watt-meter, the primary coil of said compensator connected in series with the service line, the secondary of said compensator connected to a coil in said meter, a second compensator, the primary of which is connected in multiple with the service line, and the secondary of which is connected to the potential coil of the meter, and means to prevent negative recording of said meter.

7. In an electric meter, the combination of a compensator, a series coil in said meter, a potential coil in said meter, the primary coil of said compensator connected in series with the service line and the series coil of the meter, the secondary of said compensator connected to the series coil in said meter, a second compensator, the primary of which is connected in multiple with the service line, and the secondary of which is connected to the potential coil of the meter.

8. In an electric meter, the combination of a compensator, a series coil in said meter, a potential coil in said meter, the primary coil of said compensator connected in series with the service line and the series coil of the meter, the secondary of said compensator connected to the series coil in said meter, a second compensator, the primary of which is connected in multiple with the service line, and the secondary of which is connected to the potential coil of the meter, and means to prevent negative recording of said meter.

9. An electric meter comprising in combination a rotatable armature, electromagnetic means for producing a magnetic field adapted to rotate said armature at a speed which is a function of the rate of consumption of electric energy, means responsive to the rate of consumption of electric energy for negativing the effect of said first mentioned means while the rate of consumption of energy is less than a predetermined value and for offering a substantially constant opposition to such first mentioned means while the rate of consumption of energy equals or exceeds said predetermined value, and means for registering the revolutions of said armature.

In testimony whereof I affix my signature in presence of two witnesses.

ALFRED W. BURKE.

Witnesses:
EMMA SBRITSKY,
RUTH M. THAWLEY.

Correction in Letters Patent No. 1,284,231.

It is hereby certified that in Letters Patent No. 1,284,231, granted November 12, 1918, upon the application of Alfred W. Burke, of Wilmington, Delaware, for an improvement in "Excess-Wattmeters," an error appears in the printed specification requiring correction as follows: Page 3, line 55, claim 5, and line 65, claim 6, for the compound word "watt-meter" read *meter;* and that the said Letters Patent should be read with this correction therein that the same may conform to the record of the case in the Patent Office.

Signed and sealed this 24th day of December, A. D., 1918.

[SEAL.]

F. W. H. CLAY,

*Acting Commissioner of Patents.*

Cl. 171—34.